United States Patent [19]

Dorrough et al.

[11] Patent Number: 5,287,269
[45] Date of Patent: Feb. 15, 1994

[54] APPARATUS AND METHOD FOR ACCESSING EVENTS, AREAS AND ACTIVITIES

[75] Inventors: John Dorrough, Colorado Springs; Steven M. Renfrow, Pueblo, both of Colo.

[73] Assignee: Boardwalk/Starcity Corporation, Colorado Springs, Colo.

[21] Appl. No.: 550,251

[22] Filed: Jul. 9, 1990

[51] Int. Cl.$^5$ .................. G06F 15/30; G06F 15/28
[52] U.S. Cl. .................. 364/408; 364/401; 364/410; 235/380; 235/382
[58] Field of Search .............. 364/408, 401, 412, 479, 364/410; 235/379, 380, 381, 382, 382.5

[56] References Cited

U.S. PATENT DOCUMENTS

| | | | |
|---|---|---|---|
| 4,114,027 | 9/1978 | Slater et al. | 235/419 |
| 4,321,672 | 3/1982 | Braun et al. | 364/408 |
| 4,575,622 | 3/1986 | Pellegrini | 235/382 |
| 4,587,410 | 5/1986 | Milnes | 235/382 |
| 4,652,998 | 3/1987 | Koza et al. | 364/412 |
| 4,683,536 | 7/1987 | Yamamoto | 364/408 |
| 4,831,242 | 5/1989 | Englehardt et al. | 235/382 |
| 4,837,422 | 6/1989 | Dethloff et al. | 235/380 |
| 4,870,596 | 9/1989 | Smith | 364/479 |
| 4,877,946 | 10/1989 | Ando et al. | 235/380 |
| 4,882,473 | 11/1989 | Bergeron et al. | 235/380 |
| 4,884,212 | 11/1989 | Stutsman | 364/479 |
| 4,961,142 | 10/1990 | Elliott et al. | 364/408 |
| 5,010,485 | 4/1991 | Bigari | 364/408 |
| 5,036,461 | 7/1990 | Elliott et al. | 364/408 |
| 5,083,271 | 1/1992 | Thacher et al. | 364/411 |
| 5,101,098 | 3/1992 | Naito | 235/475 |
| 5,179,517 | 1/1993 | Sarbin et al. | 364/410 |

OTHER PUBLICATIONS

AB Jun. 11, 1990 pp. 36 and 30.

Primary Examiner—Roy N. Envall, Jr.
Assistant Examiner—Andrew Bodendorf
Attorney, Agent, or Firm—Timothy J. Martin

[57] ABSTRACT

An access control system and method is provided for an activities center wherein activities are available for customers. The control system employs a plurality of access cards, a comptroller processor, at least one credit station and a plurality of access stations. Each access card is encoded for a respective customer, and the comptroller processes data, creates customer account files correlated to each customer's account file identifier, stores the customer account files, verifies customer account files to determine availability of credit and issues either approval or disapproval. The credit station reads an account file identifiers on an access cards and signals the processor to open the customer account file. An access station is associated with each activity and reads an access card to signal the comptroller processor to open the customer account file. Debit circuitry within each access station generates a debt signal corresponding to a selected cost debt for the respective activity, and the comptroller processor then generates approval or disapproval depending on the customer account credit for that activity. The access station has receiving circuitry responsive to the approval or disapproval signals from the comptroller processor to grant or deny customer access to the selected activity. A plurality of types of credit are used, and the comptroller processor maintains corresponding subaccounts, and the customers may allocate payment at the credit station among the types of credit available.

26 Claims, 8 Drawing Sheets

APPARATUS AND METHOD FOR ACCESSING EVENTS, AREAS AND ACTIVITIES

FIELD OF THE INVENTION

The present invention broadly concerns control and monitor systems for allowing users access to various fee-use activities. Thus, the present invention can be implemented in a wide variety of environments, for example, in the areas of hotel, theatre and recreational fields, where user access is to be controlled on a credit or time interval, basis. The present invention especially concerns the control of usage at recreational facilities wherein users may opt to pay for usage of games, play areas and special activity events on an item-by-item basis or for a period of time on a flat rate basis.

BACKGROUND OF THE INVENTION

In virtually every business setting wherein customer access to goods or services is provided on a fee basis, the need exists to both control access and account for payment of fees where access is given to a user. In many instances, the user selects the items or services desired and pays for the same on an item-by-item basis. In such cases, a cashier is provided to total the charges for such items and to handle the financial transaction as the intermediary between the business and the customer. In other environments, it is often more desirable to provide a customer with access to an event, item or even to an area on a credit unit or time interval basis so that an attendant is not required at the actual time of the commercial transaction. For example, a customer at a grocery store typically selects the food items for purchase and takes these items to a cashier who tallies the total purchase price, accepts payment from the customer, and returns any change due from the funds provided by the customer. Examples of the latter type of control and payment can encompass a wide variety of commercial enterprises. For example, access to a hotel room is usually based on an interval of time, and it is often desirable to provide the customer with promotional credits which can be redeemed for other items such as courtesy gifts and the like. Other enterprises utilize tokens or coupons denominating unit credits which may be used in place of money for permitting access to a game or an event; example here include theatre ticket or pass books, concert series tickets, and token machines such as slot machines and other gaming devices. While the present invention has potentials in these as well as other commercial endeavors, of especial interest to the present invention is the use of the access control apparatus and system of the present invention as applied to recreational facilities and activities.

Recreational activities have always been part of human existence, and the variety of leisure activities developed by various cultures is almost endless In modern times, the increase in leisure time has created a corresponding increase in the demand for varied recreational activities; technology has responded with leisure events and recreational devices of increased diversity. The advent of micro-processing circuitry has, for example, opened a huge market for video game equipment beyond the more limited mechanical equipment of a few years ago.

Parents, in particular, have found an especial need for wholesome recreational activities for their children Different recreational facilities allow for varying degrees of parental participation in the activities of the children, ranging from active participation to mere observance. Accordingly, a trend has been to construct activity centers which offer different activity events, play areas and game machines. The most successful of these facilities typically provide recreational activities which appeal to different age groups, including not only children and youths but parents as well. A difference in activities is also desirable due to individual tastes and levels of skill. Therefore, those facilities which offer wide varieties of activities appealing to a broader customer base.

Operation of recreational facilities, however, is not without its drawbacks. These difficulties usually comprise three types. First, there can arise supervisional difficulties due to customer volume and the fact that customers include small children and even unattended youths. Second, difficulties arise in monitoring and controlling access to the various events, areas and activities so as to prevent unauthorized use. Third, difficulties are present in monitoring the cash flow in recreational facilities.

The present invention concerns the second and third of these difficulties experienced in existing recreational facilities management. Heretofore, access to the activities provided by a recreational facility has generally been one of three ways. One such technique has been the "pay as you go" method wherein a user pays for each event at the time of use. While this procedure in some instances is acceptable, it is labor intensive since each activity must be staffed, on one hand, and extra personnel are needed for the collection and counting of money on the other hand. This technique also creates many opportunities for theft therefore increasing the need for management supervision over employees. In order to eliminate some of the problems inherent with a cash based system, some recreational facilities employ the use of game tokens or coupons. This procedure, while eliminating some of the staffing problems, does little to alleviate the theft and unauthorized use since there is still the temptation to steal and resell the tokens on a black market.

Finally, some recreational facilities have elected to eliminate many of the above mentioned problems by simply establishing a single entry fee for unlimited use, usually on a day-to-day basis, for the facility. While this technique eliminates some problems, other disadvantages arise since a single use fee is not always practical and customer fees may be set at an artificially high rate. This procedure also does not allow those customers to pay only for the activities which they use; thus, these customers subsidize more intensive use by a few. This naturally acts as a negative selling point to many customers, and, in some instances, may reduce overall use.

Accordingly, there is a substantial need for facilities access and control apparatus and methodology which more efficiently manages access to events, areas and activities from an operational standpoint. There is further a need for apparatus and methodology which more securely manages the cash flow of a facility offering services and goods to users. There is also a need for improved apparatus and methodology which eliminates the labor intensity of access management. Finally, there is an especial need for an apparatus and methodology which simplifies use of a recreational facility and which allows customers a variety of options for use in payment and in the selection of games and activities.

SUMMARY OF THE INVENTION

It is an object of the present invention to provide a new and useful apparatus and methodology for controlling access to events, areas and activities available at a goods and/or service facility.

Another object of the present invention is to provide new and improved apparatus and methodology allowing customers of fee-based, controlled access facilities various payment options for use of the those facilities, such as on a credit unit, time interval, item by item or event basis.

It is another object of the present invention to provide apparatus and methodology which reduces coin and token usage for events, areas and devices at recreational facilities thus making use of the facilities more convenient to the customer.

Still a further object of the present invention is to reduce the degree of supervision necessary in the management of a recreational facility.

Yet another object of the present invention is to provide specific payment stations which concentrate cash in-flow so that monies received may be more carefully supervised and which system provides a central processing center which can account for cash flow within the facility.

According to the broad form of the present invention, then, an access control system is provided for use in a facility wherein activities, such as events, areas, devices and the like are available for customer use. The primary elements of this access control system comprise a plurality of access cards which interact with a credit station and a plurality of access stations with each activity having a respective access station. Each access card has encoded thereon an account file identifier corresponding to a particular customer account file, the status of which is maintained in a data storage memory of a central comptroller processor. At least one credit station is provided which has a card reader that reads the account file identifier from each of the access cards, when used, and generates an account file signal corresponding to that account file identifier. The credit station also includes one or more credit input devices, such as bill receivers, coin receivers, credit card receivers and the like so that a customer may make a selected payment at the credit station. The credit station then issues a credit data signal that is received by the comptroller processor which updates the respective customer account file with the amount of payment. At each access station corresponding to the activities available to the customers, another card reader is provided which can read the account file from respective access card and has a debit processor that generates an account file signal that is received by the comptroller processor which responds by opening the respective customer account file. A debit input is associated with each access station, which can be either part of the access station or incorporated into the comptroller processor. A debit signal is produced corresponding to a debit for the respective activity The comptroller processor is then responsive to the debit signal to process the customer account file according to the debit and, the comptroller processor generates either an approval signal or a disapproval signal depending upon whether the customer has sufficient or insufficient credit in the account to pay for the activity Each access control station has a receiver that is responsive to the approval and signals to grant or deny access to the customer for the selected activity.

In a more detailed form of the invention, it is preferred that the credit input device includes a selector allowing the customer to allocate his/her payment between at least two different types of credit so that the comptroller processor breaks each customer account into subaccounts that are in one-to-one correspondence with the different types of credit allocated by the respective customer. For example, one of the credit selections may be credit units whereas the other may be a credit time interval. In this instance, the comptroller processor may prioritize payment among the subaccounts to give a preferential treatment to a specific type of payment over another type of payment For example, where the customer has purchased a credit time interval, access to activities may be granted without debiting credit units until such time that the credit time interval is expired. Thus the different credit subaccounts can be in terms of monetary credit units, event credits and time credits.

Where at least some of the activities of the facility are game type machines, the access control stations associated therewith can include enabling and disabling means for activating and deactivating the machine automatically in response to the approval signal or the disapproval signal. In such event, it is preferred that the card readers associated with the game machines are the type which receive and retain the access card so that the disabling circuitry operates to disable the game machine when an access card is removed from the associated card reader.

An encoder is provided to allow the various access cards to be encoder with the account file identifiers. This encoder may also allow a customer to input data into his/her account, such as demographic data and the like. It is also preferred that each of the credit stations include a credit processor that has a credit buffer operative to receive and retain the account file identifier and the credit data and wherein each of the debit processors have a data buffer operative to receive and retain the account file identifier. The central comptroller processor then includes circuitry that Periodically polls the data buffers to retrieve the account file identifiers and the credit data when interrogated. Also, it may be seen that where prize credits are awarded for a customers performance at an activity, the prize credit may automatically be stored by the central comptroller processor in the respective customer account file for later presentation to the customer.

According to the present invention, then, a method of controlling access to the activities of a facility are also described. The broad method includes a first step of providing a plurality of access cards each having a customer account file identifier encoded thereon. Customer account files are created in a central comptroller processor so that there is a unique customer account file corresponding to each of the encoded access cards that are used to authorize access to the activities. Each of the unique customer account files are credited upon the payment from the respective customer who has been issued the respective encoded access card with the customer being able to allocate the payment into at least two different types of credit accounts so that each of the customer account files has credit subaccounts in one-to-one correspondence with the different types of credit for with the respective customer has allocated payment Finally, the method includes providing an access control station associated with each of the activities wherein in each of the access control stations can input the account file identifier of a selected encoded access card into the central comptroller processor and a debit charge corresponding to the selected activity is inputted so that the comptroller processor opens the corresponding customer account and determines whether any of the respective subaccounts have sufficient credit to authorize access to the selected activity. This method includes the step of having the comptroller processor issuing to the access control station an approval signal when sufficient credit is available in the customer account file and a disapproval signal when insufficient credit is available. The method may include the steps of prioritizing the credit subaccounts so that the comptroller processor can debit subaccounts according to a selected procedure. Again, for example, one subaccount may be monetary type credit units while the other may be a credit time interval. Thus, while the credit time interval is available, no debiting occurs with respect to the monetary credit subaccount unless a specific event or activity to be treated specially. This method then includes the step of initiating the running of the credit time interval upon the first use of the respective access card which has such a time interval credit.

These and other objects of the present invention will become more readily appreciated and understood from a consideration of the following detailed description of the preferred embodiment when taken together with the accompanying drawings, in which:

DETAILED DESCRIPTION OF THE PREFERRED INVENTION

The present invention relates to apparatus and methodology used to access recreational activities, for example, at a recreational facility. However, at the outset, it should be appreciated by the ordinarily skilled artisan that the apparatus and methodology of the present invention may be implemented in facilities other than recreational facilities and even in those recreational facilities specifically described in the present application. For example, this invention may be used to control access to hotel/motel rooms, to provide prepaid credit units for the purchase of tickets to events, provide for prepaid concessions, and a host of other applications which the ordinarily skilled person may readily recognize and implement after reading this disclosure. Thus, while the present invention is broadly described and claimed with respect to recreational facilities the scope of the present invention is in no way intended to be limited to these exemplary usages, but rather this invention can be readily extended into other areas where access to areas, events, activities, services and goods, is found desirable.

Figure 1:
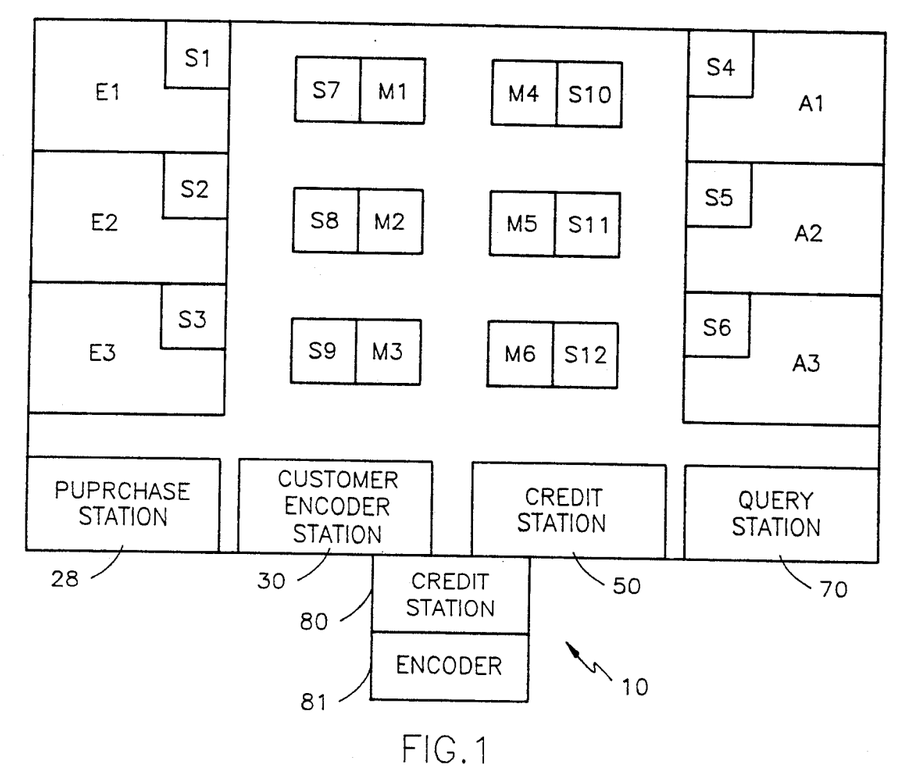
FIG. 1 is a diagrammatic view of an exemplary recreational facility incorporating the apparatus according to the preferred embodiment of the present invention.

For way of example then, an exemplary recreational facility 10 is shown in FIG. 1 and provides three representative types of recreational activity stations in the form of event stations E1-E3, play areas A1-A3 and recreational machines M1-M6. It should be understood that the number and kind of activity stations shown in FIG. 1 have been arbitrarily selected for sake of explanatory description and that this selection is in no way intended to limit the number and kind of facilities encompassed within this description.

With that in mind, and by way of explanation, it may be appreciated that event stations E1-E3 may be such activities as miniature golf, bowling, amusement rides, to name a few. Typically, these event stations are those type of activities having a defined duration or set of occurrences. For example, an amusement ride would be an event having an established duration whereas miniature golf would be an activity having a defined set of occurrences, i.e., the playing of eighteen holes on the course, even though the duration of this event is not constant for each player. Play areas A1-A3, for example, could be soft play area for children, for example, air cushion trampoline rooms, ball rooms, gymnasiums and the like. Machines M1-M6 may, for example, be video games, pinball machines, arcade-type games, skilled devices and the like.

It may be noted, however, with reference to FIG. 1, that each of the activities has associated therewith an access station or a plurality of access stations which allow a customer entry into the area, access to the event, or access to the device. Thus, as may be seen in FIG. 1, event stations E1-E3 respectfully have access stations S1-S3 Play areas A1-A3 have, respectfully, access stations S4 S6, and machines M1-M6 have, respectfully, access stations S7-S12.

Figure 2A:
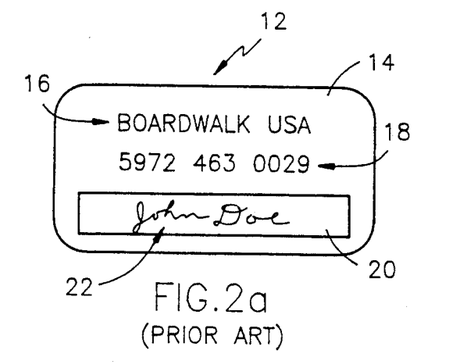
FIGS. 2(a) and 2(b) show an exemplary customer access account card known in the prior art and used in the preferred embodiment of the present invention.
Figure 2B:
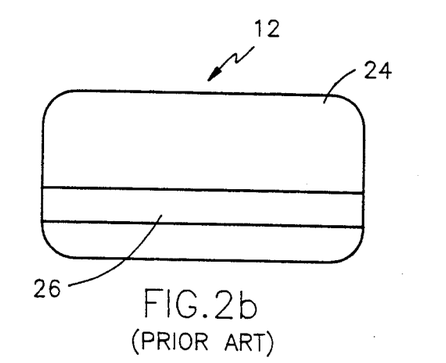

As described more thoroughly below, access to the activities through access stations S1-S12 is controlled by means of an account or access card 12 best shown in FIGS. 2a and 2b. Account card 12 is of a type standard in the industry and for which no specific claim is made other than this card in combination with the system and methodology specifically described in this invention. Account card 12 may be fabricated out of plastic, heavy paper material or other material known in the art. FIG. 2a shown the front surface 14 of card 12 where it may be seen that card 12 may be provided with a recreational facility identification 16 which may, for example, be the name of the recreational facility. If desired, a card identification number 18 may be imprinted on card 12 and a signature strip 20 provided for the signature 22 of a customer. FIG. 2b shows rear surface 24 of card 12, and rear surface 24 is provided with a magnetic recording strip 26 onto which a confidential account number may be magnetically encoded.

Turning again to FIG. 1, it may be seen that a plurality of management stations are associated with recreational facility 10 and include a card purchase station 28, an optional customer encode station 30, a credit station 50, a query station 70 and a control station 80 which includes a card encoder 81. Purchase station 30 may be any convenient vending machine or concession area wherein a customer first acquires an account card 12.

Figure 3A:
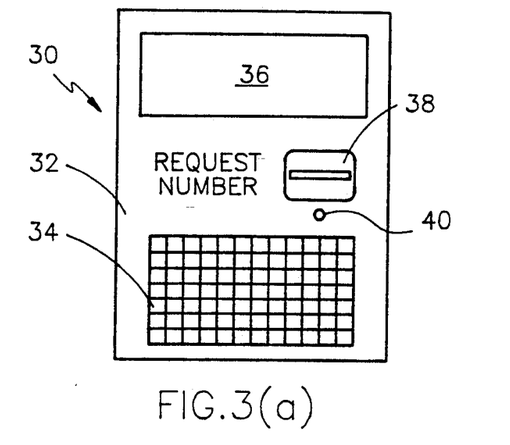
FIGS. 3(a)-3(b) are front views in elevation showing exemplary apparatus used in the methodology in the present invention and respectfully show an optional customer encode station, a credit station and a query station according to the present invention.

A representative encoding apparatus or customer encode station 30 is shown in FIG. 3a. Customer encode station 30 is optional with the system and is provided so that the customer may input data into the account file corresponding to a particular account card; this data can be demographic or identification data, for example, similarly, the customer could input an access code that thereafter must be employed to access the account file corresponding to the account card as a security means. It may be seen in FIG. 3a that encode station 30 has a housing 32 which supports a keyboard 34, a display 36, a card insertion reader/writer 38 and a request button 40. In operation, the customer first acquires an account card 12, that is pre-imprinted with a unique account file number from a purchase station 28 or as otherwise provided by the account manager. The customer then opens the corresponding account file by way of encoder station 30. Encoding station 30 is activated by the customer inserting the account card 12 through reader/writer 38 which causes the control station 80 to open the corresponding account file. Display 30 may then be driven by control station 80, as described below, to instruct the customer on how to acquire an account number, or enter data and/or an access code respecting his/her account through means of keyboard 34. When the transaction is complete, the customer retrieves the account card by card release button 40.

Figure 3B:
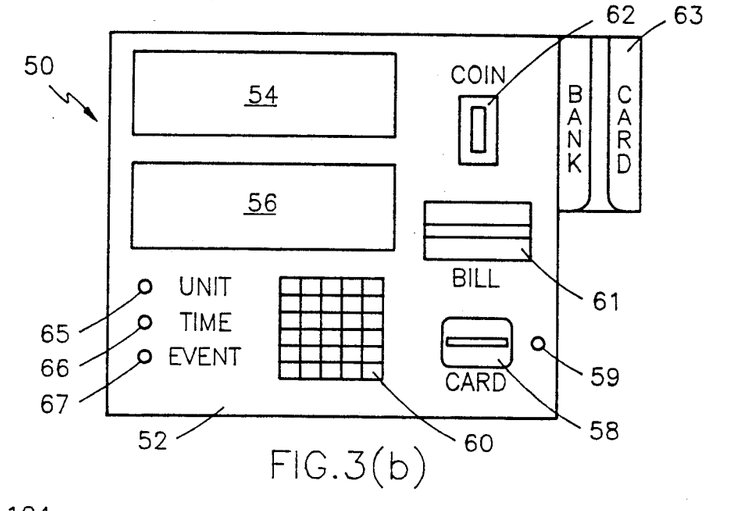

Credit station 50 is shown in FIG. 3b and includes a housing 52 that mounts two displays in the form of status display 54 and money display 56 A card reader 58 is provided to receive card 12 and read the account identifier therefrom. A bill acceptor 61, coin acceptor 62 and, if desired, optional credit card or bank credit card reader 63 is mounted in housing 52 and each is operative to receive customer payment in the form of cash or bank credit. Where a bank credit card reader 63 is employed, it is necessary that the accounting system described in this invention include means for verification of the credit card and for debiting the banking credit account of the customer corresponding thereto. Such host verification systems, of course, are standard in the industry. Activity allocation or select buttons 65, 66 and 67 are provided to select to manner in which payment is to be credited. Button 65 is used to designate the crediting of credit units, button 66 used to credit a time/play interval, i.e., a credit time interval of selected duration, and button 67 is used to designate specific payment for one or more selected activities or events. Keyboard 60 is provided to interact with the selection of credit units, time or events and to otherwise interface the selection of the activities for the payment received by credit station 50. Information relative to the amount of payment made through acceptors 61-63 may be displayed on money display 56 and the status of the customer's credit account may be displayed on status display 54. When a payment transaction is complete, the customer may retrieve his/her account card 12 by means of card release button 59. It should be understood, of course, that different types of card readers can be used in place of card reader 58 (and also previously mentioned reader/writer 38).

Figure 3C:
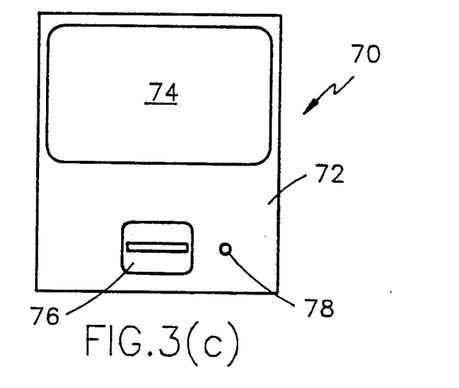

Query station 70 is shown in FIG. 3(c) and includes a housing 72, a display 74, a card reader 76 and a card release button 78. Query station 70 is used by a customer to inquire of the status of his/her account and is accessed by the account card 12 inserted and retained in reader 76 during the display of the account information on display 74. When the customer is finished with his/her account inquiry, release button 78 may be activated to discharge card 12 from card reader 76. Again a swipe reader or other appropriate card reader could be substitute for card reader 76.

Figure 4A:
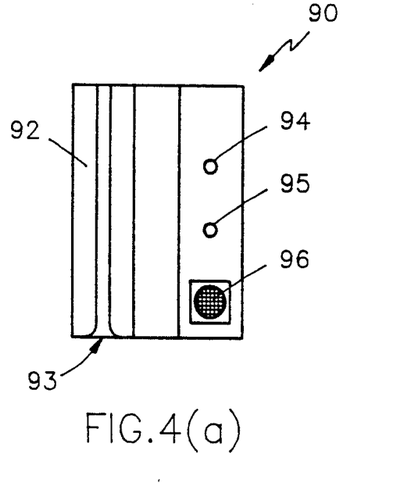
FIGS. 4(a) and 4(b) show representative activity use stations according to the present invention.
Figure 4B:
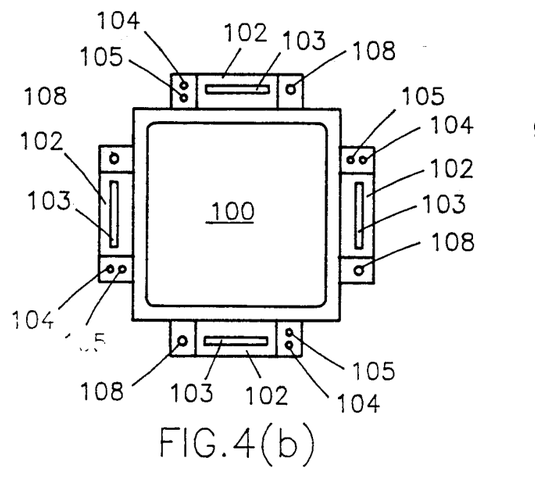

Access stations such as access stations S1–S6 are shown in FIG. 4a and access stations such as access stations S7–S12 are shown in FIG. 4b. With reference, then, to FIG. 4a, it may be seen that access station 90 includes a card reader 92 in the form of a card swiper device. In this device, as is known, an account card 12 is slid through channel 93 where strip 26 is scanned to acquire the account file identifier data. Visible verification outputs in the form of lights 94 and 95 are provided to indicate whether the customer's access to the activity has been approved or disapproved. Likewise, an audio output may be provided by speaker 96 to provide an audible indication or approval or disapproval of the customers access, all as described more thoroughly below.

Similarly, as is shown in 4b, a representative machine such as video machine 100 has associated therewith a plurality of insertion card readers 102 each of which is operative to receive and retain an account card 12 through slot 103. The station automatically activates when an account card is inserted into slot 103 and remains active only while the account card is present in the slot. Further, each card reader 102 has associated therewith visual indicating lights 104 and 105 which indicate approval/disapproval of the customer's access to the activity Audible output may again be provided, if desired, although audible output is not shown in FIG. 4b. A plurality of card readers 102 are provided where the machines allow for multiple simultaneous play. Again, different card readers could be substituted for readers 92 and 102, as desired for a selected application.

Figure 5A:
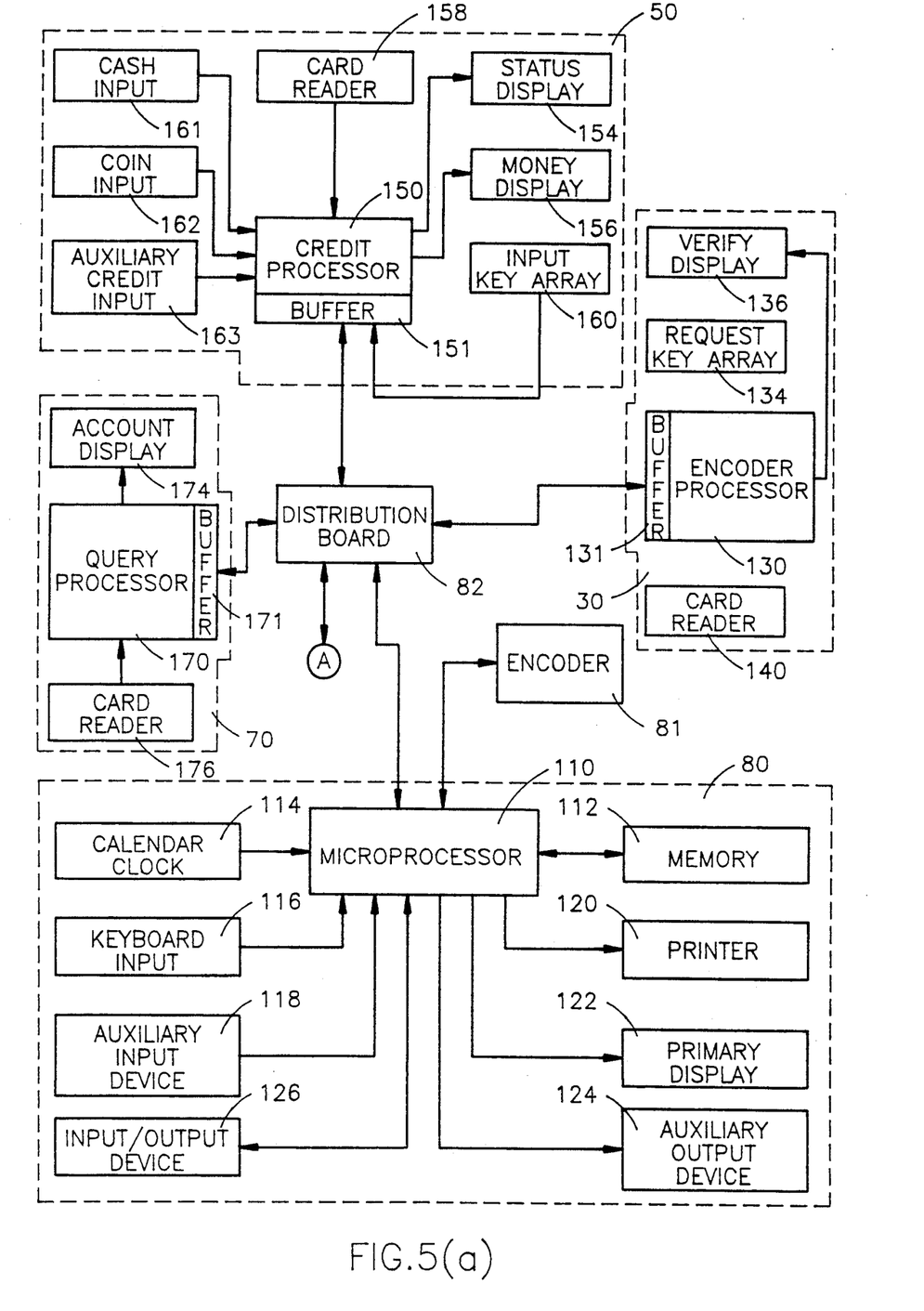
FIGS. 5a and 5b show a diagrammatic view of the apparatus according to the preferred embodiment of the present invention operative to implement the methodology of the present invention and including the control and encoding stations.
Figure 5B:
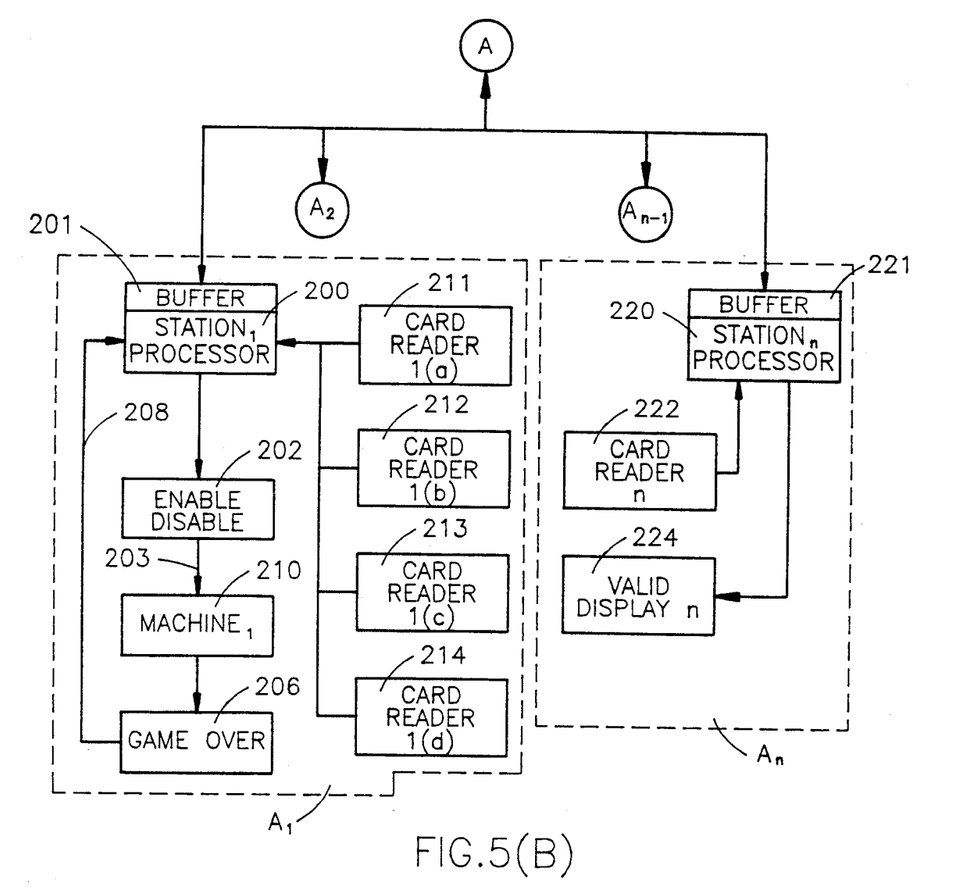

FIGS. 5a and 5b diagram show the apparatus described above to show the processing circuitry of the access system according to the method and apparatus of the present invention. In FIG. 5a, it may be seen that an access or control station 80 is a computerized system employing a central "comptroller" processor or microprocessor 110 that has associated therewith data storage means in the form of memory 112. Naturally, other computer systems may be substituted for microprocessor 110. Input devices in the form of calendar clock 114 and keyboard input 116 are provided. Other auxiliary inputs such as inputs 118 may be used as desired with microprocessor 110. Outputs may also be provided, for example, in the form of a printer 120 and a display 122. Auxillary outputs known in the art may also be used, as is shown at 124. In addition to the input/output device in the form of memory 112, other input/output devices 126 may be employed, as again is known in the art. Microprocessor 110 is connected to distribution board 82 and is electronically coupled to encoding station 30, credit station 50 and query station 70 as well as to activity stations $A_n$ shown in FIG. 5b. It should be understood at this point that a plurality of encoding stations, query stations and credit stations may be managed by microprocessor 110 even though the system is described with only one of each of these stations, by way of example.

As shown in FIG. 1 and 5(a), an encoder 81 is associated with control station 80. Encoder 81 allows the account manager to pre-encode each account card 12 with a unique account file number prior to dispensing the account cards, for example, at purchase station 28. Encoder 81 may be a magnetic writing device of any general type known in the art wherein an account file number can be retrievably written onto the strip 26. This writing device can be card swiper or an insertion device, such as described with respect to card readers 38 and 92, where a recording head is incorporated into the unit. If desired, control station encoder 81 can be eliminated by the use of customer encode station 30, in which case the customer receives blank account card 12 and requests an account file number at encode station 30. Microprocessor 110 then assigns a unique file number which is written on the respective account card 12 by a recording head associated with reader/writer 38.

Encoding station 30 has an encoder processor circuit 130 which is electronically coupled to distribution board 82 through buffer circuitry 81 and thus to microprocessor 110. Buffer circuitry 81 includes data buffers which receive and hold account file identifiers until polled by microprocessor 110 as described below. Encoder processing circuit drives display 136 and receives input from request key array 134 which, with reference to FIG. 3a, may be seen to comprise keyboard 34 and request button 40. Encoder processor 130 has a card reader 140 which acts to read the magnetic strip 26 of an account card 12 thus supplying microprocessor 110 with an account identifier.

Credit station 50 is shown in FIG. 5a and includes a processor circuitry 150 which drives status display 154 and money display 156. Processor circuitry 150 also includes buffer circuitry 151 having data buffers to hold account file identifiers and credit data inputted until such time that buffer circuitry 151 is polled by microprocessor 110. Credit processor circuitry 150 receives input from card reader 158, bill acceptor 161, coin acceptor 162 and auxillary credit input 163. Further, user interface is provided through input key array 160 which may include, with reference to FIG. 3b, the keyboard 60 and the credit select buttons 65, 66 and 67. Again it may be seen that credit processor circuitry 150 is electronically coupled to microprocessor 110 through distribution board 82.

Query station 70 is shown in FIG. 5a and includes query processor circuitry 170 which is electronically coupled to microprocessor 110 through distribution board 82. Query processor 170 receives input from card reader 176 and displays account information received from microprocessor 110 on account display 174. Query processor 170 includes buffer circuitry 171 having data buffers to retain account file identifiers until polled by microprocessor 110.

As is shown in FIG. 5a, microprocessor 110 is electronically coupled through distribution board 82 to a plurality of activity stations $A_n$. This interaction may now be appreciated with reference to FIG. 5b where it may be seen that a plurality of activity stations $A_1$, $A_2$, $A_3$, ... $A_n$ is contemplated and include the access stations such as access stations $S_1$-$S_{12}$. The two different types of access stations corresponding to access stations such as access station 90 and those corresponding a play machine 100 are shown in FIG. 5b. As is shown in FIG. 5(b), a first access station $A_1$ includes a station processor circuit 200 which has buffer circuitry 201 associated therewith. Buffer circuitry 201 latches account file identifiers of the account cards used to access machine 210. Enable/disable circuitry 202 which is connected to machine 210 in order to activate and de-activate the machine 210. Station processor circuitry 200 receives input from card readers 211-214. In operation, once a valid account card is inserted in one of card readers 211-214, station processor 200 drives enable/disable circuitry 202 to produce a signal on line 203 that operates to enable machine 210 so that play may be accessed by one or more customers having a valid card. Card readers 211-214 retain the account cards until play is completed. If an account card is removed from its respective card reader 211-214 during play, station processor 200 causes enable/disable circuitry 202 to produce a disable signal on line 203 thus disabling machine 210. Assuming the play cycle is allowed to run its course, when the game is completed on machine 210, machine 210 causes game over-circuitry 206 to produce a game over signal on line 208 which is inputted to signal processor 200 that the game has been completed. Access station $A_n$ is shown in FIG. 5b and includes station processor 220 which has associated therewith card reader 222. Card reader 222 is of the type shown in FIG. 4a and is used to merely to determine if an account card is valid or invalid. Station processor circuitry 220 interfaces with microprocessor 110 through buffer circuitry 221 and indicates whether the account card is valid or invalid on valid display 224 by issuing an approval or disapproval signal after interrogating the customer account file correlated thereto. Buffer circuitry 221 contains data buffers operative to hold account file identifiers until polled by microprocessor 110. Naturally, different card readers 211-214 can be used within the scope of this invention. Where card readers 211-214 are of the non-retention kind (e.g. a card swipe reader) it is useful to provide software controls in microprocessor 110 to preclude simultaneous activation of a plurality of stations by a single account card.

Figure 6A:
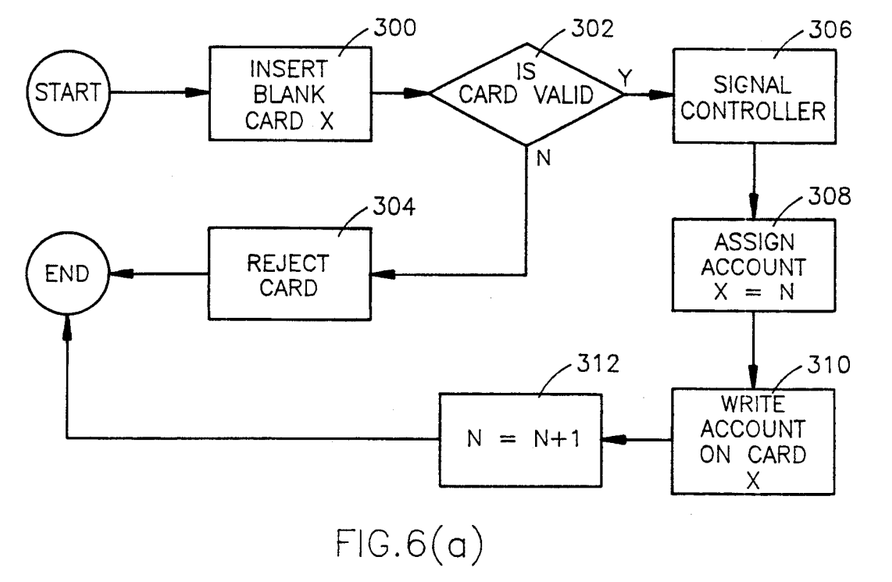
FIGS. 6(a), 6(b), 6(c) and 6(d) respectfully show flow chart diagrams of the operation of the encoder, the customer encoding station, the query station and the credit station, respectfully.
Figure 6B:
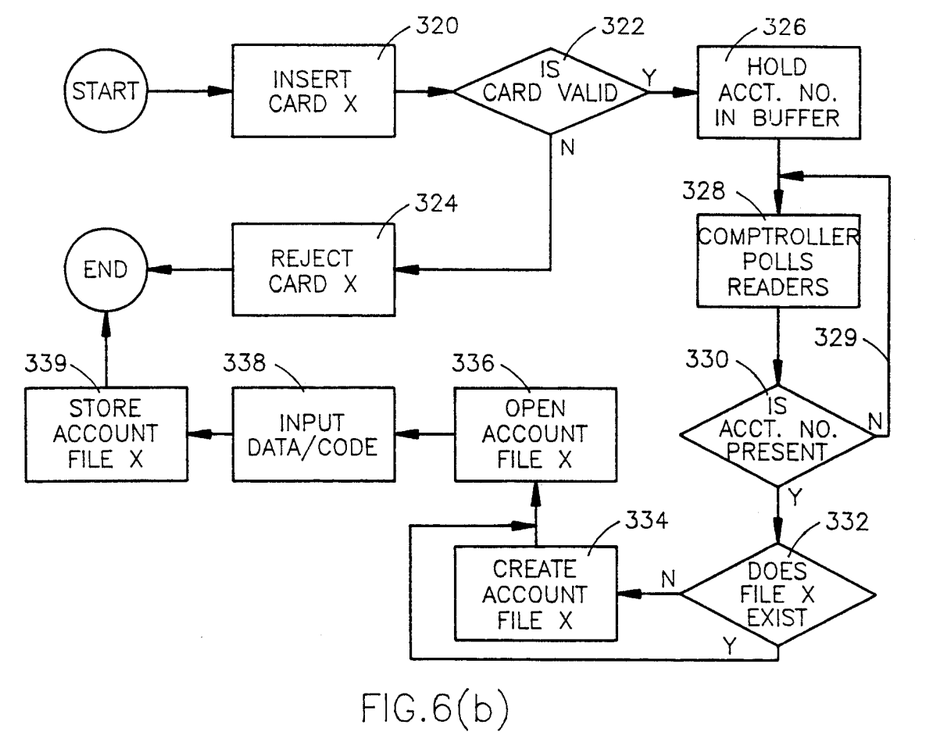
Figure 6C:
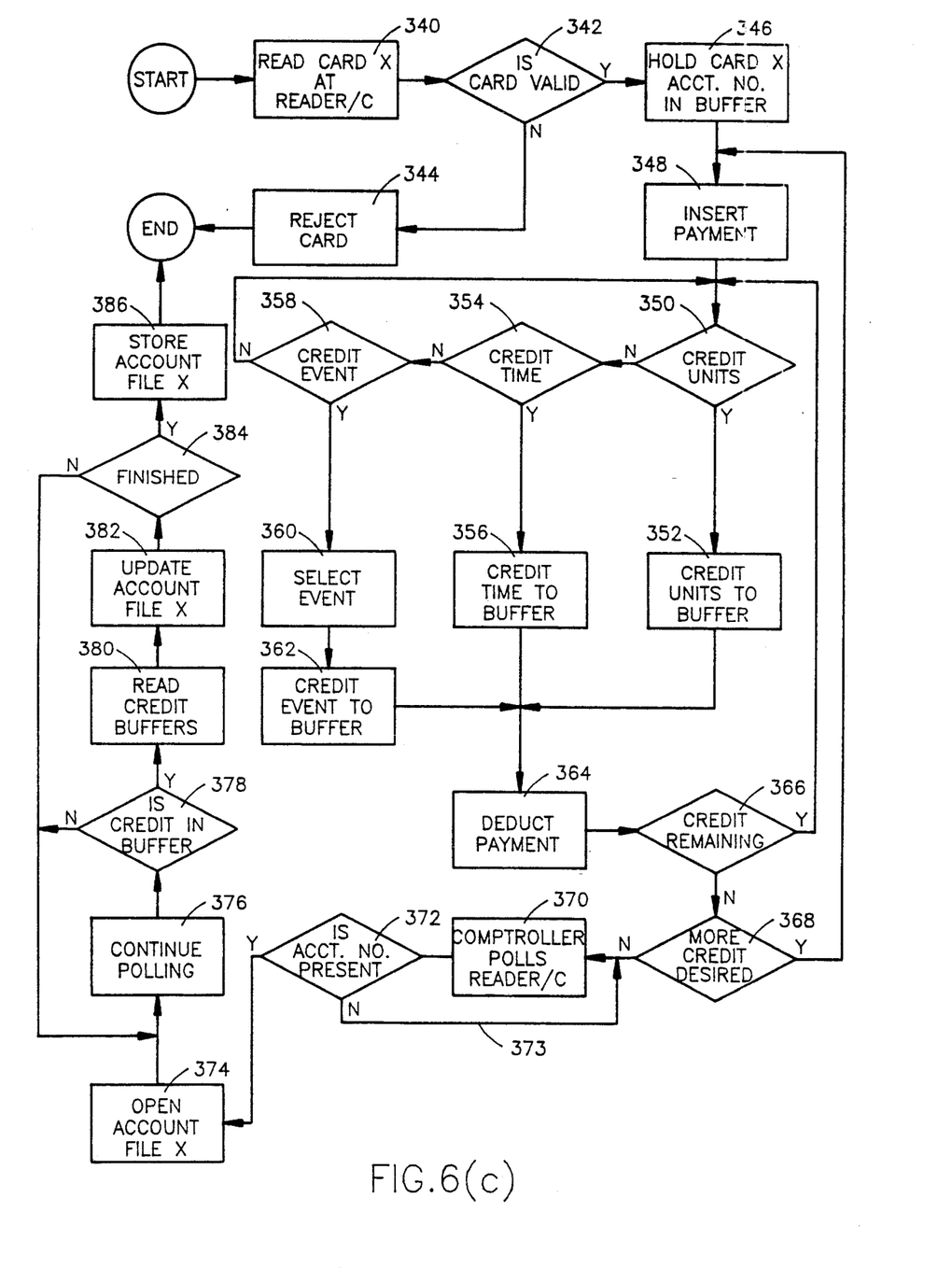
Figure 6D:
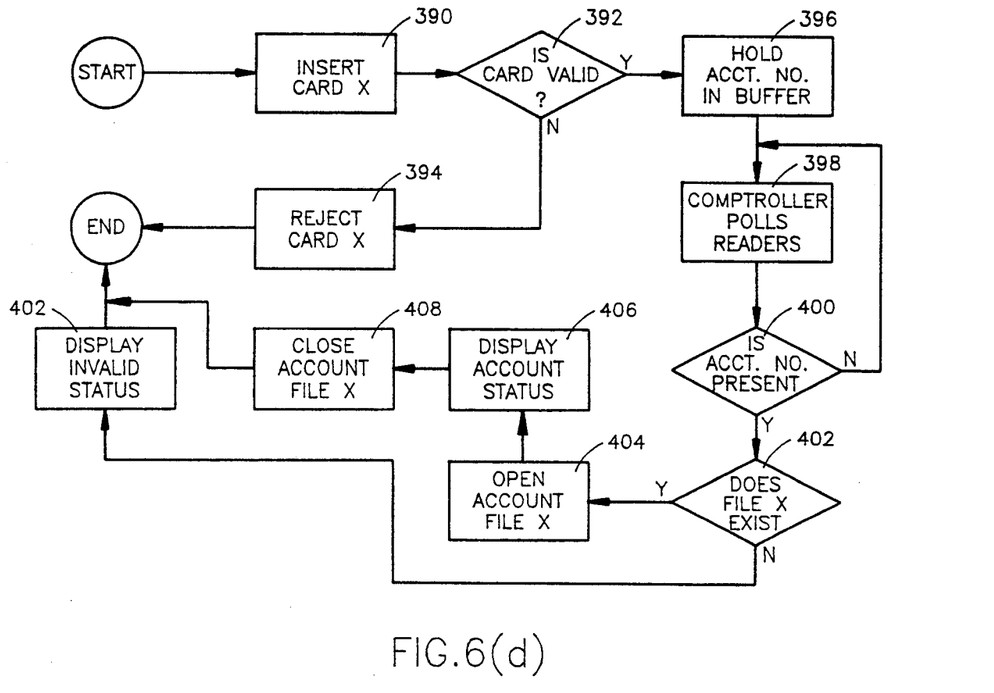
Figure 7:
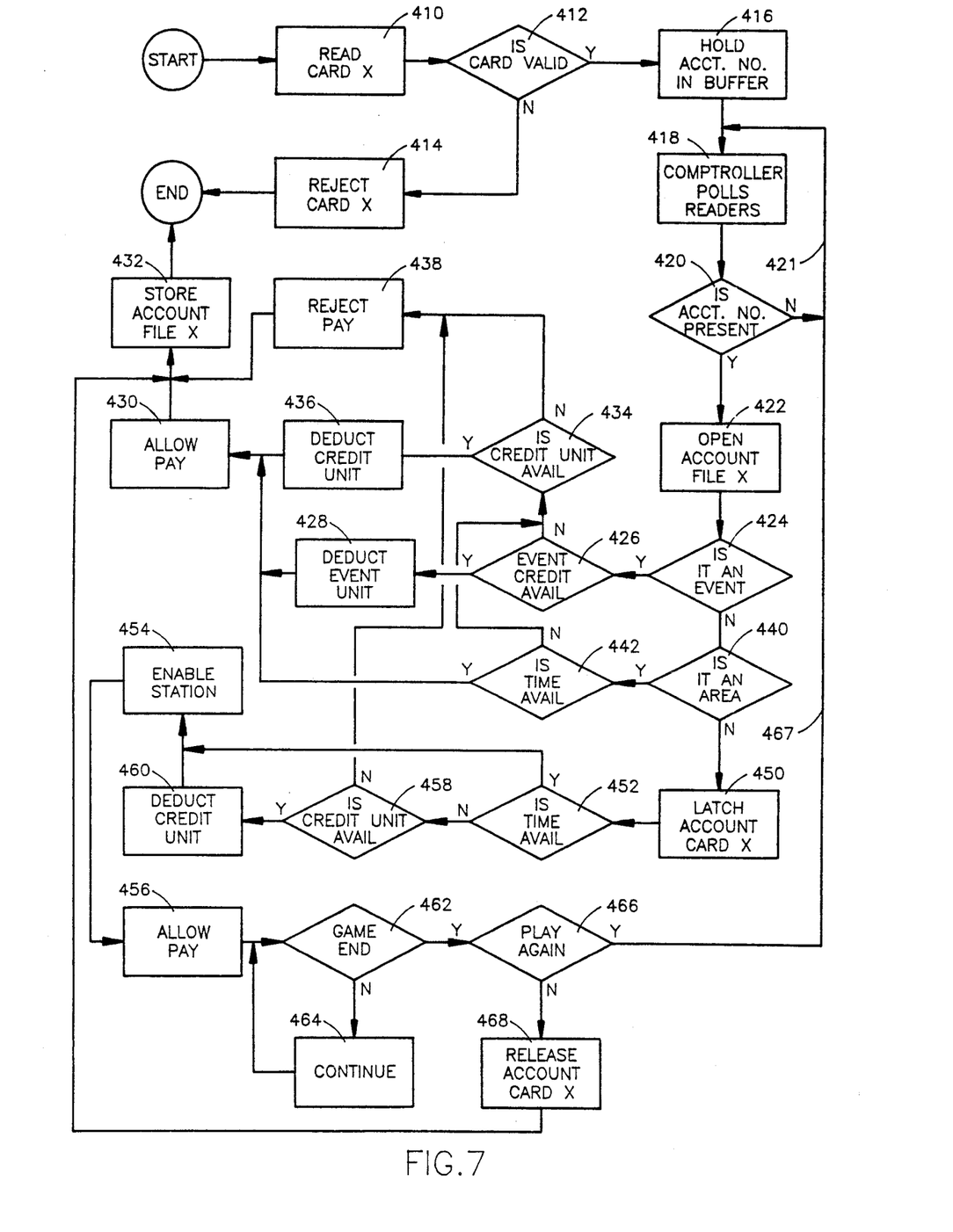
FIG. 7 shows a flow chart diagram showing the methodology of the present invention for use stations as controlled by the central processing system.

Integration of the apparatus described above and the methodology according to the present invention may be now more fully appreciated with the processing flowcharts diagrammed in FIGS. 6(a), 6(b), 6(c), 6(d) and in FIG. 7. In understanding these flowcharts, reference will also be made to the apparatus diagrams of FIGS. 5(a) and 5(b). Turning to the flowchart shown in FIG. 6(a), the processing steps of encoder 81 (or, if desired, customer encoding station 30) is shown. Here, a virgin account card 12 is inserted as "card X" for example, into the card read/write device associated with encoder 81 as is shown at processing step 300. The validity or invalidity of this card is determined at step 302 so that, if the virgin card is not acceptable to this system it is rejected at 304 which ends the encoding processing. On the other hand, where the virgin card is a valid card, the encoder 81 signals the comptroller microprocessor 110 as is shown at processing step 306. Microprocessor 110 then calls up from memory 112 the available accounts and assigns the virgin card an account number N as is shown at step 308 and simultaneously causes the account file number identifier to be encoded onto card X as is shown at 310. Microprocessor 110 then increments its account files as is shown at processing step 312 so that the next available account number will be assigned to the next card for which an account is requested.

Where the processing system provides a customer encoding station, such as station 30, the processing steps are shown in 6(b). Here, card X is insert into a card reader, such as card reader 38 shown in FIG. 3(a). This insertion step is shown, in FIG. 6(b), as step 320. The validity or invalidity of card X is determined at step 322 so that, if the card is not acceptable to the system it is rejected at 324 which ends the further encoding process. Where card X is accepted, the account file identifier or account number is held in the buffer of encoder processor 130, as is shown at processing step 326. Microprocessor 110 periodically polls all of the encoder processors as is shown at step 328 to determine whether the encoder processor holds an account file identifier, as is shown at 330. If no account file identifier is present, the comptroller continues the polling operation, shown as loop 329, until such time that an account file identifier is located in the encoder processor 130. Where an account file is present in the buffer of the encoder processor 130, microprocessor 110 then determines whether or not an account file has been set up for that particular card identifier, as is shown at step 332. Where no account previously exists, microprocessor 110 creates and opens a new account file X, as shown at 334, but where the file account already exists, the microprocessor 110 opens that account at 336. The customer then inputs whatever data or code information is desired, as shown at 338, and this information is then stored by microprocessor 10 in the account file, as is shown at 339.

Once the customer has a valid account card whether provided at station 28 in pre-encoded form or after the encoding by the customer with customer encoding station 30, which card is hereinafter referred to as "card X" with X being the account number or identifier, the customer is ready to make payment on the account so that card X may be used to access the various activities of the facility. This processing flowchart is shown in FIG. 6(c) where it may be seen that card X is inserted at the credit reader 158 as is shown at step 340. Again inquiry is made as to whether the card is valid at step 342 and the card is rejected if invalid, as is shown at step 344. If card X is valid, the data buffers associated with credit processor 150 hold the file identifiers at 346. The customer may then insert payment as is shown at processing step 348. This payment may be received through bill acceptor 161, coin acceptor 162, or where provided, by auxillary credit input 163. Once payment is made, credit processor 150 inquires of the customer as to the manner in which payment is to be allocated, e.g., whether the customer desires that the payment be accounted as credit units, a time credit interval or for a special event. If credit units are selected at step 350 the selected units are stored in the data buffers as shown at 352. If the use indicates that he/she does not require credit units, the inquiry is made as to whether the customer wants an interval of time credited as is shown at 354. Should the customer desire to credit a special event, then this is selected at 358. The customer selects the event at 360, and the result is stored in the data buffers at 362. After the crediting of any of the units, time or events the credit processor 150 deducts the cost at 364 and then determines if there is still credit remaining or if the customer desires more credit payments, as respectively shown at steps 366 and 368. The credit loop is then repeated until the customer declines to further credit his/her account. At this time, the customer is finished with the crediting and all information is stored in the data buffers. Once all of the data is stored in the buffers associated with credit processor 150, this data is available to comptroller or microprocessor 110.

As noted above, microprocessor 110 periodically polls the various processors associated with this system, including credit processor 150. Accordingly, the comptroller polls credit processor 150, as is shown at processing step 370. If the account number and credit data is present, microprocessor 110 opens account file X as is shown at 374. Microprocessor 110 continues to poll credit processor 150, as shown at 376 to determine if credit is present in the buffers associated with credit processor 150 as is shown at step 378. At such time that credit is present, microprocessor reads the credit buffers at 380 and updates the account file X at 382 until finished, as shown at 384. When finished, the account file X is stored in the memory 112 associated with microprocessor 110, as shown at step 386. The crediting process is then concluded.

FIG. 6(d) shows the processing steps accomplished by query station 70. This station is used by the customer to determine the status of his/her account at any given time. Here, the customer inserts his/her card into reader 176 so that card X is read by the query card reader 176 as is shown at processing step 390 in FIG. 6(c). Again, the card is tested to see if it is valid as shown at step 392 and, if not, the card is rejected at 394. However, where the card is deemed valid by query processor 170, the file identifier is stored in the data buffers associated with query processor 170. Microprocessor 110 periodically polls query processor 170 to determine if a file identifier is present, as shown at 398. When an identifier is located, microprocessor 110 determines if a corresponding file X exists as shown at 400. If not, an invalid display is generated at 402. If a corresponding file X does exist, microprocessor 110 opens the file at 404 and the file X status is displayed on the display 174 as diagrammed at step 406. Microprocessor 110 then closes account file X at 408 and the query transaction ends.

Finally, reference is made to FIG. 7 wherein card X may be used by a customer to access various activity stations such as stations $A_1$-$A_n$. In FIG. 7, it may be seen that the customer inserts card X in a card reader such as card reader 211-214 or a card reader of type shown a 222. This step of reading card X is shown at location 410 in FIG. 7, and the validity of card X is determined at 412. If card X is invalid, it is rejected at 414, but, if card X is valid, its file identifier is stored in the data buffers associated with the respective station processor at 416. Microprocessor 110 periodically polls the station processors as is shown at 418 to determine if a file identifier is present as is shown at 420. If not, microprocessor continues the polling loop 421 until an identifier is found, in which case the corresponding account file X is opened at 422.

It should be understood that in the exemplary embodiment of the present invention, a customer may pay for various events, activities, games and the like by means of credit units, especial event fees or, in certain instances, receive a specified duration of play. Accordingly, once microprocessor 110 has located a file identifier at a specific station processor and has opened the corresponding account file X, inquiry is made as to whether the station processor is associated with a specific event, as is shown at 424. If the station processor is related to a special event, inquiry is made at 426 as to whether the customer has a specific event credit for that event. If the event credit is available, the event credit is deducted at 428 play is allowed at 430 and the account file X is stored at 432. If the special event credit is unavailable, inquiry is made at 434 as to whether sufficient credit units are available to pay for that specified event. If so, the number of credit units are deducted at 436, play is again allowed at 430 and the updated account file is stored at 432. Where neither an event credit is available nor is are there sufficient credit units available, the participation of the customer is rejected at 438.

On the other hand, where the selected activity is not a specific event, then inquiry is made at 440 as to whether the selected activity is an area for which access is controlled. If it is an area, inquiry is made at 442 as to whether the account file X is on a time duration play and, if so, whether time is available remaining in that account. If either the card is not on a timed duration play or where insufficient time remains, inquiry is made at 434 as to whether sufficient credit units are available to allow the customer to utilize the specific area activity. If so, the credit units are deducted at 436 and play is allowed at 430 and the updated account file X is stored at 432. If neither time is available nor credit units available, play is rejected at 438 the account file X is stored at 430 and the transaction terminates.

Where the selected activity is more in the form of a game or other device, the account card X is "latched" in the reader at 450. By latching, it is meant that either the card is physically retained by the hardware so that removal of the card de-activates the machine or. in the account card is flagged so that it may not be simultaneously used for any other activity. Once the account card X is latched, inquiry is made at 452 as to whether the card is on a time interval of play and whether time is available for play. If the card ia on a time interval play and time is available, the specific station is enabled at 454 and play is allowed at 456. If time is unavailable on the card or if the card is not a time interval card at all, inquiry is made at 458 as to whether credit units are available to pay for the particular game or device selected. If credit is available, the credit units are deducted at 460 and the station is enabled at 454 so that play is allowed at 456. If neither time is available nor credits available, play is rejected at 438 and the account file X is stored at 432 to conclude the transaction.

Assuming that play is allowed at 456, inquiry is then made at 462 as to whether the game is over. If the game is not over, play continues at 464 until the game is ended. Inquiry is then made at 466 as to whether the customer desires to play again. If so, return loop 467 again places the card identifier in the buffer awaiting the polling of the station processor by microprocessor 110 as is shown at 467. If the customer does not play again, the customer withdraws or releases card X at 468 and the account file X is then stored at 432, by microprocessor 110, and the transaction ends.

From the foregoing, it may be seen that the apparatus and the method of the present invention allows for a variety of activities to be accounted by a central processing system or control station 80 including microprocessor 110. Microprocessor 110 is any suitable computer of sufficient size and memory capacity to handle the accounts for a given facility. The various credit data and debit data may be electronic signals generated by the various processors of the above-described system, as is well known. It may be appreciated that the present system allows for a facility to charge for activities on either a flat rate for a time interval of play, a special price for event play or for individual credit units which may be "spent" by the customer on various ones of the activities as desired. Thus, this system has tremendous flexibility in the manner of accounting which may be selected by the owner to accommodate his/her special needs. Further, by providing a "play board" having an account number that is monitored by a central system, this system eliminates many of the disadvantages of previous accounting play techniques for recreational facilities, in particular. Customers no longer need to carry a substantial number of gaming tokens or money to play different machines and the dispensing of tokens or change or currency is simplified and focused on selected credit stations.

Accounting and removal of money from the credit stations can therefor be more tightly controlled. Further, only a limited number of employees of the facility need have access to the credit stations for removal of cash proceeds accruing to the operation which minimizes risks of theft of money or gaming tokens. Likewise, since this system is controlled from a central control station, a substantial number of supervisory personal are eliminated. This increases the ratio of customers per employee thus substantially reducing overhead in the management of such a facility.

All of the above apparatus and method has been described with some degree of particularly with respect to the preferred embodiment of this invention, is should be understood that the ordinarily skilled artist could vary the equipment and processing steps of this specific embodiment without departing from the inventive concepts contained herein. Thus, for example, different card readers and processing systems could be used, and a different processing flowchart could be designed for appropriate use at a selected facility. A variety of different apparatus and software controls are many, and are believed to be within the abilities of the ordinarily skilled artisan who has had the benefit of reading the foregoing description, these systems need not be specifically described.

Accordingly, the present invention has been described with some degree of particularity directed to the preferred embodiment of the present invention It should be appreciated, though, that the present invention is defined by the following claims construed in light of the prior art so that modifications or changes may be made to the preferred embodiment of the present invention without departing from the inventive concepts contained herein.

We claim:

1. An access control system for use in a facility having activities, such as events, areas, devices and the like, to which customers may be granted access, comprising:

a plurality of access cards providing an account file identifier corresponding to said customers, each of said access cards encoded with an account file identifier for a respective customer;

comptroller processor means for processing data according to command instructions and for creating customer account files correlated to said account file identifiers, said comptroller processor means having data storage means associated therewith for storing said customer account files and having verification means for inquiring into each said customer account file to determine an availability of credit therein and issuing an approval status signal when credit is available and a disapproval status signal when credit is not available in the respective customer account file;

a credit station including a first card reader operative to read the account file identifiers on said access cards and to generate a first account file signal corresponding to a selected access card and including credit input means for receiving payment from a customer and for generating credit data signals having credit data indicating a credit payment by the customer, said credit input means including payment allocation means for allowing the customer to allocate said payment between a plurality of different types of credit and operative to generate separate credit data signals for the different types of credit, said comptroller processor means operative in response to said first account file signal to open the respective customer account file corresponding to the respective account file identifier and operative in response to said credit data signals to create credit sub-accounts in the respective customer account file in one-to-one correspondence with the different types of credit allocated by the respective customer and to increase the credit in the respective customer account file according to said credit data signals;

a plurality of access stations, there being an access station associated with each said activity for controlling access to the respective activity, each access station including a second card reader operative to read the account file identifiers on said access cards and to generate a second account file signal corresponding to the account file identifier on the selected access card, said comptroller processor means responsive to said second account file signal to open the respective customer account file corresponding to the respective account file identifier;

debit means associated with each said access station for generating a debit signal corresponding to a selected cost debit for the respective activity, said comptroller processor mans responsive to said debit signal to decrease the credit in the respective customer account file according to said cost debit, said controller processor means generating an approval signal where the respective customer account file has credit in an amount at least equal to the selected cost debit for the respective activity and generating a disapproval signal where the respective customer account file has credit less than the selected cost debit for the respective activity; and receiving means associated with said access station for receiving said approval and disapproval signals from said comptroller processor and for granting and denying the customer access to the respective activity.

2. An access control system according to claim 1 wherein different ones of said activities have associated therewith different types of cost debits, said comptroller processor means including means for allocating said different types of cost debits to different respective credit sub-accounts.

3. An access control system according to claim 2 wherein said different types of credit are selected from a group consisting of: monetary credit units, event credits, and time credits.

4. An access control system according to claim 1 wherein at least some of said activities are game machines and wherein the access control stations associated therewith each include enabling and disabling means for activating and deactivating the respective said machine in response to the approval signal.

5. An access control system according to claim 4 wherein the access control stations associated with the game machines have second board readers that receive and retain said access cards, said enabling and disabling means operative to disable a respective said game machine when the access card is removed from the respective said second card reader thereof.

6. An access control system according to claim 1 including means for encoding each of said card means with a respective said account file identifier.

7. An access control system according to claim 1 including query processor means for interrogating said comptroller processor means to determine status of the customer account correlated to the account file identifier of the selected access card.

8. An access control system according to claim 1 wherein said credit stations each include a credit processor having a first data buffer operative to receive and retain the account file identifier on the selected access card in response to said first account file signal and operative to receive and retain said credit data in response to said credit data signal, wherein said debit station each include a debit processor having a second data buffer operative to receive and retain the account file identifier on the selected access card in response to said second account file signal.

9. An access control system according to claim 8 wherein said comptroller processor means includes means to periodically poll said first and second data buffers and to signal said credit and debit processors to transmit said account file identifiers and said credit data to said comptroller processor means.

10. An access control system according to claim 9 wherein said comptroller processor means is operative in response to said account file identifiers on any of said data buffers to open a customer account file correlated to the selected access card.

11. An access control system according to claim 1 including means at each respective access station for displaying approval and disapproval status respectively in response to said approval and disapproval signals.

12. An access control system according to claim 1 wherein a customer may receive prize credits based on his/her performance at a selected activity and including means associated with the respective access station for generating a prize signal corresponding to a prize credit to be awarded the customer, said comptroller processor means responsive to said prize signal to credit the customer's account file with said prize credit.

13. Apparatus operative to monitor access to activities and to grant and deny access to a customer according to one or more selected conditions, comprising:

card means associated with a plurality of customers for providing an account file identifier corresponding to each said customer;

comptroller processor means for processing data according to command instructions and for creating customer account files correlated to said account file identifiers;

data storage means associated with said comptroller processor means for storing said customer account files;

credit processor mans for inputting account file identifiers and credit data into said comptroller processor means, said credit processor means including first card reader means for reading an account file identifier on a selected one of said card means and for producing a first account file signal corresponding to the account file identifier thereon and including credit input means for receiving payment from a customer corresponding to said selected one of said card means and for generating a first credit data signal having first credit data of a first type and a second credit data signal having second credit data of a second type different from said first type, said first and second credit data corresponding to an amount of payment, said comptroller processor means responsive to said first account file signal and said first and second credit data signals to open the customer account file corresponding to the account file identifier and to credit the customer account file with said payment to create a respective credit account having first credit data corresponding to said first credit signal and second credit data corresponding to said second credit signal;

a first debit processor means for inputting account file identifiers and first debit data into said comptroller processor means, said first debit processor means including second card reader mans for reading the account file identifier on the selected one of said card means, for producing a second account file signal corresponding to the account file identifier thereon and for generating a first debit data signal having the first debit data, said comptroller processor means responsive to said second account file signal and said first debit signal to open the respective customer account file corresponding to the account file identifier and to debit the respective customer account file with said first debit data; and a second debit processor means for inputting account file identifiers and second debit data into said comptroller processor means, said second debit processor means including third card reader means for reading the account file identifier on a selected one of said card means, for producing a third account file signal corresponding to the account file identifier thereon and for generating a second debit data signal having the second debit data, said comptroller processor means responsive to said third account file signal and said second debit signal to open the respective customer account file corresponding to the account file identifier and to debit the respective customer account file with said second debit data.

14. An access control system for use in a facility having activities, such as events, areas, devices and the like, to which customers may be granted access, comprising;

a plurality of access cards providing an account file identifier corresponding to said customers, each of said access cards encoded with an account file identifier for a respective customers;

a credit station including a first card reader operative to read the account file identifier on each of said access cards and generate a first account file signal corresponding thereto and including credit input means for receiving payment from a customer and including credit allocation means for permitting the customer to allocate said payment between at least two different types of selected credit, one of which comprises credit units and the other of which comprises a time interval credit, whereby said credit input means generates a first credit data signal having first credit data representative of a selected number of credit data respective of a selected number of credit units and a second credit data signal representative of a selected interval of time;

comptroller processor means for processing data according to command instructions and for creating customer account files correlated to said account file identifiers, said customer account files each having credit sub-accounts correlated to the different types of selected credit allocated by the respective customer, said comptroller processor means having data storage means associated therewith for storing said customer account files and responsive to said first account file signal to open the customer account file corresponding to the respective account file identifier and responsive to said first and second credit data signals to credit the respective credit sub-accounts with said payment as allocated by the customer and to maintain a first sub-account of a total available credit units and to maintain a second sub-account of a total available time credit interval, said comptroller processor means having verification means for inquiring into each said customer account file to determine an availability of different types of credit therein and issuing an approval status signal when credit is available and a disapproval status signal when credit is not available in the respective customer account file;

a plurality of access stations, there being an access station associated with each said activity for controlling access to the respective activity, each access station including a second card reader operative to read the account file identifiers on said access cards and to generate a second account file signal corresponding to the account file identifier on a selected access card, said comptroller processor means responsive to said second account file signal to open the respective customer account file corresponding to the respective account file identifier;

debit means associated with each said access station for generating a debit signal corresponding to a selected cost debit for the respective activity, said comptroller processor means responsive to said debit signal to interrogate the respective customer account file to determine whether a time credit interval is available in the second sub-account and to issue an approval signal where the respective second sub-account has an unexpired time credit interval therein and where the respective second sub-account does not have an unexpired time credit interval therein to determine whether the respective first sub-account has sufficient credit units in an amount at least equal to the selected cost debit for the respective activity and to issue said approval signal where sufficient credit units are available in the respective first sub-account, said comptroller processor means generating a disapproval signal where the respective customer account file does not have an unexpired time credit interval and contains credit units in an amount less than the selected cost debit for the respective activity; and receiving means associated with said access control station for receiving said approval and disapproval signals from said comptroller processor and for granting and denying the customer access to the respective activity.

15. An access control system according to claim 14 wherein said comptroller processor means is operative to update the respective customer account file by debiting the first sub-account when payment is made by credit units.

16. An access control system according to claim 14 wherein said comptroller processor means includes a clock means for debiting said second sub-accounts to cause expiration of the respective time interval credit therein.

17. An access control system according to claim 16 wherein said comptroller processor means includes an expiration initialization means for beginning expiration of the time interval credit of a customer account file when the said access card corresponding thereto is first used.

18. An access control system according to claim 14 wherein said credit allocation means allows each customer to allocate each said payment among said credit units, said time interval credit and event credits, said credit input means generating a third credit signal having third credit data representative of a selected event, said comptroller processor means creating a third credit sub-account in response to the third credit signal for a respective customer account file and including means for prioritizing debits among each of said sub-accounts.

19. In a facility wherein customers are permitted and denied access to activities that have debit charge associated therewith, a method of controlling access to the activities comprising the steps of:
provided a plurality of access cards available for acquisition by a prospective customer, each of the access cards having means for receiving a customer account file identifier encoded thereon;
encoding said access cards as encoded access cards such that there is a unique customer account file identifier for each of said encoded access cards;
issuing encoded access cards to prospective customers for use by said customers in authorizing access to selected ones of said activities;
creating customer account files in a central comptroller processor such that there is a unique customer account file corresponding to each of the encoded access cards that are used to authorize access to the activities;
crediting each of the unique customer account files upon receipt of payment from the respective customer who has been issued the respective encoded access card, each said customer being able to allocate said payment to at least two different types of credit, each of aid customer account files being created to have credit sub-accounts in one-to-one correspondence with the different types of credit for which the respective said customer has allocated said payment; and
providing an access control station associated with each of the activities, each said access control station including means for inputting into said comptroller processor the account file identifier corresponding to the encoded access card that is used to access a selected activity and the debit charge corresponding to the selected activity, said comptroller processor operative in response to the account file identifier to open the corresponding customer account file and to review whether any of the respective sub-accounts have sufficient credit to authorize access to the selected activity, said comptroller processor issuing to the access control station an approval signal when sufficient credit is available in the respective customer account file and issuing to the access control station a disapproval signal when insufficient credit is available in the respective customer account file said access control stations responsive respectively to the approval signal and the disapproval signal to grant and deny the respective customer access to the activity.

20. The method according to claim 19 wherein one of said types of credit is a credit time interval of a duration corresponding to a selected amount of payment, said comptroller processor operative in response to input of an account file identifier to issue said approval signal to at least some of said access control stations at all times during said credit time interval.

21. The method according to claim 20 wherein said credit time interval begins to run at the time the respective access card is first used to access one of the activities.

22. A method according to claim 20 wherein some of said activities are game machines which are enabled by said approval signal and including the step of disabling any game machines for which an attempt is made to simultaneously use a selected access card during the duration of the respective credit time interval.

23. A method according to claim 19 wherein said comptroller processor periodically polls each of said access control station to determine if an account file identifier is present said comptroller processor operative in response to the account file identifier to open the corresponding customer account file.

24. A method according to claim 19 including the step of displaying an approval and a disapproval status at each said access control station respectively in response to said approval and disapproval signals.

25. A method according to claim 19 wherein some of said activities include areas to which access may be granted, events which may be attended and goods and services which may be purchased for monetary credits.

26. A method according to claim 19 wherein prize credits are awarded based on a customer's performance at selected activity and including the step of accumulating said prize credits in each of said customer account files.

* * * * *